(12) United States Patent
Hayashi et al.

(10) Patent No.: US 12,384,634 B2
(45) Date of Patent: Aug. 12, 2025

(54) CONVEYANCE DEVICE (71) Applicant: YAMAHA HATSUDOKI KABUSHIKI KAISHA, Iwata (JP)

(72) Inventors: Yoshinori Hayashi, Iwata (JP); Hideaki Kouda, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 63 days.

(21) Appl. No.: 18/683,427

(22) PCT Filed: Aug. 30, 2021

(86) PCT No.: PCT/JP2021/031761
§ 371 (c)(1),
(2) Date: Feb. 13, 2024

(87) PCT Pub. No.: WO2023/032006
PCT Pub. Date: Mar. 9, 2023

(65) Prior Publication Data
US 2024/0343504 A1 Oct. 17, 2024

(51) Int. Cl.
*B65G 54/02* (2006.01)
*H02K 41/03* (2006.01)

(52) U.S. Cl.
CPC ............ *B65G 54/02* (2013.01); *H02K 41/031* (2013.01)

(58) Field of Classification Search
CPC ....... B65G 54/02; H02K 41/03; H02K 41/031
USPC .............................................. 198/619, 805
See application file for complete search history.

(56) References Cited

U.S. PATENT DOCUMENTS

| | | | |
|---|---|---|---|
| 9,766,096 B2 * | 9/2017 | Nagura | G01D 5/34715 |
| 10,921,163 B2 * | 2/2021 | Hsiao | G01D 5/34792 |
| 2011/0043053 A1 * | 2/2011 | Shikayama | H02K 41/031 |
| | | | 310/12.15 |
| 2011/0068731 A1 | 3/2011 | Yoshida et al. | |
| 2011/0100252 A1 * | 5/2011 | Fukukawa | H02K 41/031 |
| | | | 104/293 |
| 2019/0062066 A1 * | 2/2019 | Tsai | B65G 43/00 |
| 2022/0333954 A1 * | 10/2022 | Tiapkin | G01D 5/2451 |
| 2023/0264904 A1 * | 8/2023 | Zaniboni | B65G 54/02 |
| | | | 198/619 |

(Continued)

FOREIGN PATENT DOCUMENTS

| | | | | |
|---|---|---|---|---|
| JP | H05-272986 A | 10/1993 | | |
| JP | 7-163128 | * 6/1995 | | H02K 41/03 |
| JP | H07-074807 B2 | 8/1995 | | |

(Continued)

OTHER PUBLICATIONS

International Search Report issued in PCT/JP2021/031761; mailed Nov. 16, 2021.

(Continued)

*Primary Examiner* — James R Bidwell
(74) *Attorney, Agent, or Firm* — Studebaker Brackett PLLC (57) ABSTRACT

A conveyance device includes a magnetic scale including linear movement magnetic scales formed linearly along a linear direction, and curvilinear movement magnetic scales formed curvilinearly along a curvilinear direction. The linear movement magnetic scales and the curvilinear movement magnetic scales are spaced apart from each other.

20 Claims, 6 Drawing Sheets

FIRST EMBODIMENT (56) References Cited

U.S. PATENT DOCUMENTS

2023/0275499 A1\* 8/2023 Shen .................... H02K 41/031

FOREIGN PATENT DOCUMENTS

| | | |
|---|---|---|
| JP | 2000-195001 A | 7/2000 |
| JP | 4151417 B2 | 9/2008 |
| JP | 5170045 B2 | 3/2013 |
| JP | 5509049 B2 | 6/2014 |
| JP | 5783410 B2 | 9/2015 |
| WO | 2019/007199 A1 | 1/2019 |

OTHER PUBLICATIONS

Written Opinion of the International Searching Authority issued in PCT/JP2021/031761; mailed Nov. 16, 2021.

\* cited by examiner

*FIG.1*

FIRST EMBODIMENT

*FIG.2*

111-111 LINE SECTIONAL VIEW

FIG.3
112-112 LINE SECTIONAL VIEW

FIG.4
TOP VIEW

FIG.5
BOTTOM VIEW

FIG.6 ENLARGED VIEW OF PORTION D

FIG.7 LINEAR PORTION

FIG.8 CURVILINEAR PORTION

FIG.9
SECOND EMBODIMENT

FIG.10
THIRD EMBODIMENT
TOP VIEW

FIG.11
FOURTH EMBODIMENT

FIG.12
FIFTH EMBODIMENT

FIG.13
FIRST MODIFIED EXAMPLE

FIG. 14
SECOND MODIFIED EXAMPLE

FIG. 15
THIRD MODIFIED EXAMPLE

FIG. 16

CONVEYANCE DEVICE

CROSS-REFERENCE TO RELATED APPLICATION

This application is a National Stage of International Patent Application No. PCT/JP2021/031761, filed Aug. 30, 2021, the entire content of which is incorporated herein by reference.

BACKGROUND

Technical Field

The present disclosure relates to a conveyance device, and more particularly, it relates to a conveyance device including a slider and a drive module.

Background Art

Conventionally, a conveyance device including a slider and a drive module is known. Such a conveyance device is disclosed in International Publication No. 2019/007199, for example.

International Publication No. 2019/007199 discloses a linear conveyance device including a movable body (slider) and a stator module (drive module). The movable body moves linearly or curvilinearly due to a magnetic field generated in the stator module.

The movable body disclosed in International Publication No. 2019/007199 includes a base, a first magnetic generator, and a second magnetic generator. The first magnetic generator and the second magnetic generator are attached to the base while being adjacent to each other and in contact with each other. The first magnetic generator generates magnetism to detect the position of the movable body during linear movement. The second magnetic generator generates magnetism to detect the position of the movable body during curvilinear movement.

The stator module disclosed in International Publication No. 2019/007199 includes a magnetic reader that reads the magnetism of each of the first magnetic generator and the second magnetic generator. In the linear conveyance device, the position of the movable body is detected based on the magnetism of each of the first magnetic generator and the second magnetic generator read by the magnetic reader.

SUMMARY

In the linear conveyance device disclosed in International Publication No. 2019/007199, the first magnetic generator and the second magnetic generator are attached to the base while being adjacent to each other and in contact with each other. Therefore, in the linear conveyance device disclosed in International Publication No. 2019/007199, magnetic interference is conceivably likely to occur between the first magnetic generator and the second magnetic generator. Thus, in the linear conveyance device disclosed in International Publication No. 2019/007199, it is desired to more reliably reduce or prevent magnetic interference between the first magnetic generator (linear movement magnetic scale) and the second magnetic generator (curvilinear movement magnetic scale).

Accordingly, the present disclosure provides a conveyance device capable of more reliably reducing or preventing magnetic interference between a linear movement magnetic scale and a curvilinear movement magnetic scale.

A conveyance device according to an aspect of the present disclosure includes a slider movable along a linear direction and a curvilinear direction, a drive module to move the slider along the linear direction or the curvilinear direction, a magnetic scale including linear movement magnetic scales formed linearly along the linear direction, and curvilinear movement magnetic scales formed curvilinearly along the curvilinear direction and provided on either the slider or the drive module, and magnetic sensors provided in either the drive module or the slider to detect magnetism of the linear movement magnetic scales and the curvilinear movement magnetic scales, respectively. The linear movement magnetic scales and the curvilinear movement magnetic scales are spaced apart from each other.

In the conveyance device according to this aspect of the present disclosure, as described above, the linear movement magnetic scales and the curvilinear movement magnetic scales are spaced apart from each other. Accordingly, a distance between the linear movement magnetic scales and the curvilinear movement magnetic scales can be ensured, and thus magnetic interference between the linear movement magnetic scales and the curvilinear movement magnetic scales can be more reliably reduced or prevented.

In the conveyance device according to this aspect, the linear movement magnetic scales and the curvilinear movement magnetic scales are preferably provided on a same surface or different surfaces and are preferably spaced apart from each other. Accordingly, the linear movement magnetic scales and the curvilinear movement magnetic scales can be provided on the same surface or the different surfaces of the same member, and thus as compared with a case in which the linear movement magnetic scales and the curvilinear movement magnetic scales are provided on surfaces of different members, an increase in the number of components of the conveyance device can be reduced or prevented.

In the conveyance device according to this aspect, the magnetic scale is preferably provided on the slider, and the magnetic sensors are preferably provided in the drive module. Accordingly, the drive module is fixed at a predetermined location, and thus unlike a case in which the magnetic sensors are provided in a movable structure like the slider, power supply equipment for supplying power to the magnetic sensors can be easily connected to the magnetic sensors.

In this case, the slider preferably includes a slider frame in which the magnetic scale is located such that the linear movement magnetic scales and the curvilinear movement magnetic scales face the magnetic sensors in an upward-downward direction or in a width direction orthogonal to the upward-downward direction and a moving direction of the slider. Accordingly, the magnetic scale can be housed inside the slider frame, and thus as compared with a case in which the magnetic scale is located outside the slider frame having the same size, an increase in the size of the slider can be reduced or prevented.

In the conveyance device according to this aspect, the magnetic scale preferably further includes a base with which the linear movement magnetic scales and the curvilinear movement magnetic scales are provided integrally. Accordingly, the linear movement magnetic scales and the curvilinear movement magnetic scales are provided integrally with the same base, and thus even when the base expands or contracts due to temperature changes, errors can be caused in measurement of the position of the slider according to the expansion and contraction of the base with respect to the linear movement magnetic scales and the curvilinear movement magnetic scales. Therefore, the errors in position measurement of the linear movement magnetic scales and the curvilinear movement magnetic scales can be substantially equal to each other. Consequently, the same correction value can be used to correct errors in position measurement that occur when the slider moves linearly and errors in position measurement that occur when the slider moves curvilinearly, and thus a control for position acquisition can be facilitated.

In this case, the base includes a first surface on which the linear movement magnetic scales are provided, and a second surface that is different from the first surface and on which the curvilinear movement magnetic scales are provided. Accordingly, as compared with a case in which the linear movement magnetic scales and the curvilinear movement magnetic scales are aligned on the same surface, an increase in the dimension of the base in a direction in which the linear movement magnetic scales and the curvilinear movement magnetic scales are aligned can be reduced or prevented, and thus an increase in the size of the conveyance device in the alignment direction described above can be reduced or prevented.

In the conveyance device including the second surface different from the first surface, the second surface is preferably arranged on a back side of the first surface in the base. Accordingly, the first surface constitutes the front surface of the base, and the second surface constitutes the back surface of the base such that in a plan view, the linear movement magnetic scales and the curvilinear movement magnetic scales can overlap each other. Thus, an increase in the dimension of the base in the moving direction of the slider can be reduced or prevented.

In the conveyance device in which the second surface is arranged on the back side of the first surface in the base, the magnetic scale preferably includes a magnetic shielding plate located between the linear movement magnetic scales and the curvilinear movement magnetic scales to block magnetism emitted from each of the linear movement magnetic scales and the curvilinear movement magnetic scales. Accordingly, magnetic interference between the linear movement magnetic scales and the curvilinear movement magnetic scales can be reduced or prevented by the magnetic shielding plate, and thus a distance by which the linear movement magnetic scales and the curvilinear movement magnetic scales are spaced apart from each other can be reduced. Consequently, thicknesses required for the bases arranged between the linear movement magnetic scales and the curvilinear movement magnetic scales can be reduced, and thus an increase in the size of the magnetic scale including the linear movement magnetic scales, the curvilinear movement magnetic scales, and the bases can be reduced or prevented.

In the conveyance device including the first surface and the second surface, the second surface and the first surface are preferably substantially orthogonal to each other. Accordingly, the linear movement magnetic scales are provided on the first surface, and the curvilinear movement magnetic scales are provided on the second surface that is substantially orthogonal to the first surface, and thus the magnetic sensor that detects the magnetism of the linear movement magnetic scales can be placed in the vicinity of the magnetic sensor that detects the magnetism of the curvilinear movement magnetic scales. Consequently, a space required to place the magnetic sensor that detects the magnetism of the linear movement magnetic scales and the magnetic sensor that detects the magnetism of the curvilinear movement magnetic scales can be made compact.

In the conveyance device in which the second surface is orthogonal to the first surface, the second surface and the first surface are preferably substantially orthogonal to each other, and the second surface is preferably a curved surface corresponding to a curvature of the curvilinear movement magnetic scales. Accordingly, the curved surface of the second surface is formed along the curvilinear direction of the slider, and thus the position of the slider during curvilinear movement can be appropriately detected by the curvilinear movement magnetic scales provided on the second surface.

In the conveyance device including the base, the linear movement magnetic scales and the curvilinear movement magnetic scales are preferably provided on a same surface of the base and are preferably spaced apart from each other in a direction in which the linear movement magnetic scales and the curvilinear movement magnetic scales are aligned. Accordingly, as compared with a case in which the linear movement magnetic scales and the curvilinear movement magnetic scales are aligned in a direction perpendicular to the same surface, an increase in a space for installing the linear movement magnetic scales and the curvilinear movement magnetic scales in the direction perpendicular to the same surface can be reduced or prevented.

In the conveyance device according to this aspect, the magnetic scale preferably further includes a base member in which the linear movement magnetic scales and the curvilinear movement magnetic scales are provided, the curvilinear movement magnetic scales preferably include first curvilinear scales formed along a first curvilinear direction as the curvilinear direction, and second curvilinear scales formed along a second curvilinear direction different from the first curvilinear direction, and the base member preferably includes a linear position detection surface that constitutes an upper surface or a lower surface of the base member and on which the linear movement magnetic scales are provided, a first curvilinear position detection surface that protrudes from the linear position detection surface and on which the first curvilinear scales are provided, and a second curvilinear position detection surface that faces the first curvilinear position detection surface and on which the second curvilinear scales are provided. Accordingly, with the first curvilinear scales and the second curvilinear scales, the position of the slider can be measured when the slider moves curvilinearly in a plurality of curvilinear directions including the first curvilinear direction and the second curvilinear direction, and thus the position measurement can be performed even when the slider moves curvilinearly in curvilinear directions that are opposite to each other. Thus, the degree of freedom of a path along which the slider moves can be improved.

In the conveyance device according to this aspect, the magnetic scale is preferably provided on the slider, and in a moving direction of the slider, first ends of the linear movement magnetic scales and first ends of the curvilinear movement magnetic scales are preferably located at substantially a same position, and second ends of the linear movement magnetic scales and second ends of the curvilinear movement magnetic scales are preferably located at substantially a same position. Accordingly, the lengths of the linear movement magnetic scales and the curvilinear movement magnetic scales can be substantially equal to each other in the moving direction of the slider, and thus when either the linear movement magnetic scales or the curvilinear movement magnetic scales are set to the maximum length according to the installation space, either the curvilinear movement magnetic scales or the linear movement magnetic scales can have the same maximum length. Consequently, the magnetic sensors are arranged such that a distance between the magnetic sensors matches the maximum length, and thus the magnetic sensors can be aligned with a maximum distance between the magnetic sensors. Thus, the number of magnetic sensors required to measure the position of the slider can be minimized.

According to the present disclosure, as described above, it is possible to more reliably reduce or prevent magnetic interference between the linear movement magnetic scales and the curvilinear movement magnetic scales.

DETAILED DESCRIPTION

Embodiments embodying the present disclosure are hereinafter described on the basis of the drawings.

First Embodiment

The structure of a conveyance device 100 according to a first embodiment of the present disclosure is described with reference to FIGS. 1 to 8.

Structure of Conveyance Device

Figure 1:
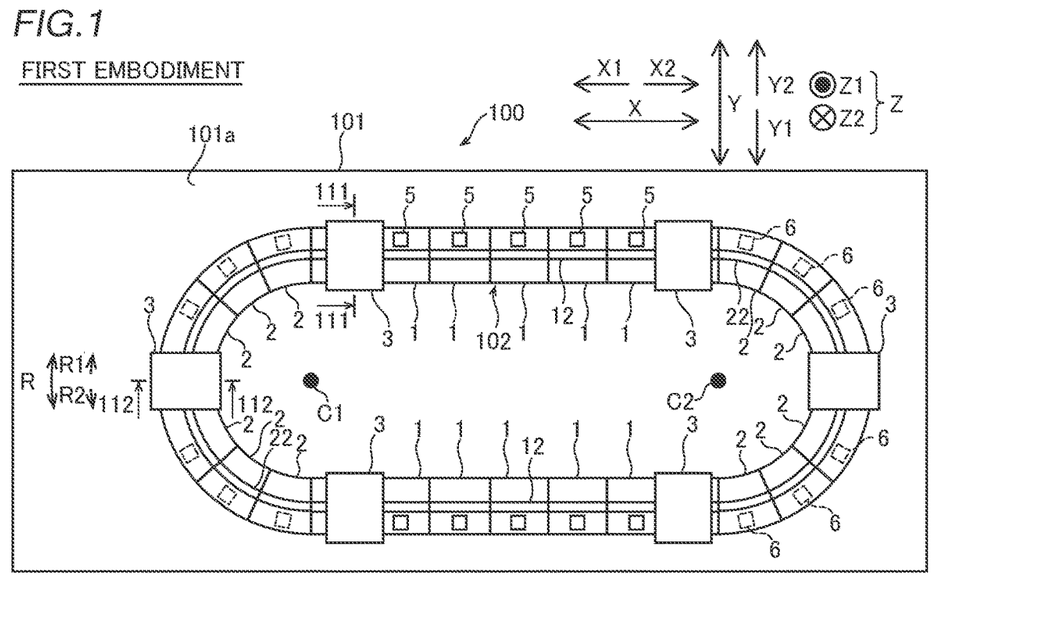
FIG. 1 is a plan view showing a conveyance device according to a first embodiment.
Figure 2:
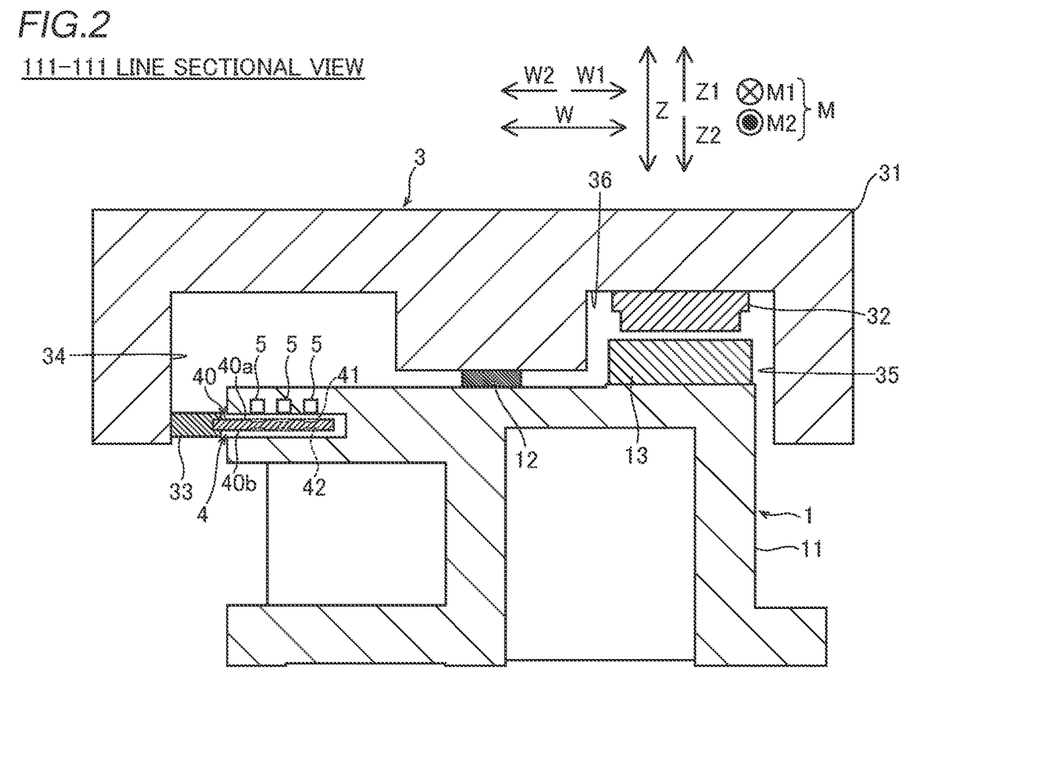
FIG. 2 is a sectional view taken along the line 111-111 in FIG. 1.

As shown in FIGS. 1 and 2, the conveyance device 100 is installed on the upper surface 101a of a platform 101. Although not shown, various robots are installed on the platform 101 to carry out tasks such as transferring workpieces such as boards and mounting electronic components or the like onto the boards. The various robots are arranged along a circular path 102 for sliders 3 described below. The conveyance device 100 is a linear conveyor that moves the sliders 3 along the circular path 102 using a linear motor.

The conveyance device 100 moves the sliders 3 toward the work positions of the various robots. Specifically, the conveyance device 100 includes a plurality of linear movement drive modules 1, a plurality of curvilinear movement drive modules 2, a plurality of sliders 3, magnetic scales 4, magnetic sensors 5, and magnetic sensors 6. The plurality of linear movement drive modules 1 and the plurality of curvilinear movement drive modules 2 form the circular path 102 for the sliders 3. The linear movement drive modules 1 and the curvilinear movement drive modules 2 are examples of a "drive module" in the claims.

In horizontal directions, a direction in which the linear movement drive modules 1 extend is defined as an X direction, one direction in the X direction is defined as an X1 direction, and the other direction in the X direction is defined as an X2 direction. In the horizontal directions, a direction orthogonal to the X direction is defined as a Y direction, one direction in the Y direction is defined as a Y1 direction, and the other direction in the Y direction is defined as a Y2 direction. A direction orthogonal to the X direction and the Y direction is defined as a Z direction (upward-downward direction), one direction in the Z direction is defined as a Z1 direction (upward direction), and the other direction in the Z direction is defined as a Z2 direction (downward direction). Furthermore, the moving direction of the sliders 3 is defined as an M direction, one direction in the M direction is defined as an M1 direction, and the other direction in the M direction is defined as an M2 direction. A width direction orthogonal to the M direction and the Z direction is defined as a W direction, one direction in the W direction is defined as a W1 direction, and the other direction in the W direction is defined as a W2 direction.

Each of the plurality of linear movement drive modules 1 is a linear conveyor module. The plurality of linear movement drive modules 1 are arranged on the platform 101. The plurality of linear movement drive modules 1 are linearly connected to each other in the X direction. The plurality of linear movement drive modules 1 are arranged on the Y1 direction side and the Y2 direction side. The plurality of linear movement drive modules 1 have the same structure, and thus one linear movement drive module 1 arranged on the Y2 direction side and the X1 direction side is described.

The linear movement drive module 1 is a device that moves the sliders 3 along a linear direction in the X1 direction or the X2 direction. The linear movement drive module 1 stops the sliders 3 at the work positions of the robots and moves the sliders 3 toward the work positions of the next robots after the work. Furthermore, the linear movement drive module 1 can move the sliders 3 while performing a position/speed control during the work, while also moving the sliders 3 toward the work positions of the next robots after the work.

Specifically, as shown in FIG. 2, the linear movement drive module 1 includes a support member 11, a guide rail 12, and a linear motor stator 13.

The support member 11 supports the guide rail 12 and the linear motor stator 13. The support member 11 is made of metal such as aluminum. Thus, the support member 11 is a metal frame. Although an example has been shown in which the support member 11 according to this embodiment is made of metal, the support member 11 may be made of resin.

The guide rail 12 has a function of guiding the sliders 3. The guide rail 12 is arranged on a central portion of the upper surface of the support member 11 in the Y direction. The guide rail 12 extends in the X direction. The linear motor stator 13 includes a plurality of electromagnets. Although an example has been shown in which the guide rail 12 according to this embodiment is arranged on the central portion of the upper surface of the support member 11 in the Y direction, the guide rail 12 may be arranged on a position offset from the central portion of the upper surface of the support member 11 in the Y direction. Furthermore, the guide rail 12 may be provided on a side surface of the support member 11 instead of on the upper surface of the support member 11.

As shown in FIG. 1, each of the plurality of curvilinear movement drive modules 2 is a linear conveyor module. The plurality of curvilinear movement drive modules 2 are arranged on the platform 101. The plurality of curvilinear movement drive modules 2 are connected to each other along a curvilinear direction. The plurality of curvilinear movement drive modules 2 are arranged on the X1 direction side and the X2 direction side on the platform 101. The plurality of curvilinear movement drive modules 2 have the same structure, and thus one curvilinear movement drive module 2 arranged on the X1 direction side is described. The curvilinear direction refers to a direction along an R direction (circumferential direction) around a central axis C1 (or C2) extending in the Z direction.

The curvilinear movement drive module 2 is a device that moves the sliders 3 along the R1 direction or the R2 direction (curvilinear direction). The curvilinear movement drive module 2 stops the sliders 3 at the work positions of the robots and moves the sliders 3 toward the work positions of the next robots after the work. Furthermore, the curvilinear movement drive module 2 can move the sliders 3 while performing a position/speed control during the work, while also moving the sliders 3 toward the work positions of the next robots after the work.

Figure 3:
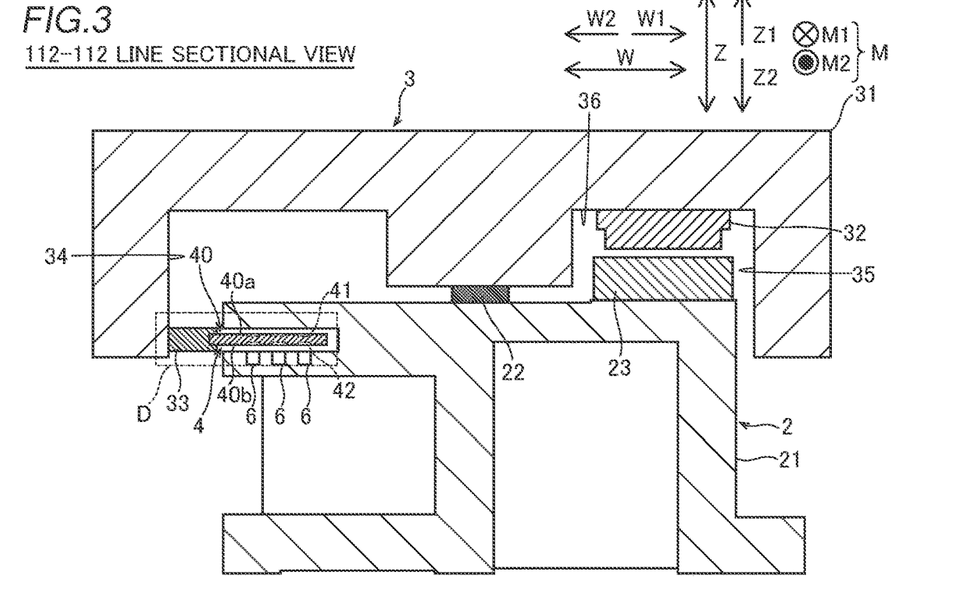
FIG. 3 is a sectional view taken along the line 112-112 in FIG. 1.

Specifically, as shown in FIG. 3, the curvilinear movement drive module 2 includes a support member 21, a guide rail 22, and a linear motor stator 23.

The support member 21 supports the guide rail 22 and the linear motor stator 23. The support member 21 is made of metal such as aluminum. Thus, the support member 21 is a metal frame. Although an example has been shown in which the support member 21 according to this embodiment is made of metal, the support member 21 may be made of resin.

The guide rail 22 has a function of guiding the sliders 3. The guide rail 22 is arranged on a central portion of the upper surface of the support member 21 in a direction orthogonal to the central axis C1. The guide rail 22 extends along the R direction. The linear motor stator 23 includes a plurality of electromagnets. Although an example has been shown in which the guide rail 22 according to this embodiment is arranged on the central portion of the upper surface of the support member 21 in the direction orthogonal to the central axis C1, the guide rail 22 may be arranged on a position offset from the central portion of the upper surface of the support member 21 in the direction orthogonal to the central axis C1. Furthermore, the guide rail 22 may be provided on a side surface of the support member 21 instead of on the upper surface of the support member 21.

As shown in FIG. 1, the plurality of sliders 3 are arranged on the circular path 102. The plurality of sliders 3 all have the same structure, and thus one of the plurality of sliders 3 is described.

The slider 3 is movable along the linear direction and the curvilinear direction. The slider 3 moves in the linear direction by being guided by the guide rail 12. The slider 3 moves in the curvilinear direction by being guided by the guide rail 22. The linear direction refers to a direction of movement along the X direction. The curvilinear direction refers to a direction of movement along the R direction.

Thus, the slider 3 slides linearly and curvilinearly on the circular path 102. Specifically, as shown in FIGS. 2 and 3, the slider 3 includes a slider frame 31, a linear motor mover 32, and a bracket 33.

The slider frame 31 is made of a metal material such as aluminum. The linear motor mover 32 is provided on the W1 direction side on an inner upper surface 36 provided between a pair of inner side surfaces 34 and 35 of the slider frame 31 facing each other in the W direction. The linear motor mover 32 includes a back yoke (not shown) and permanent magnets (not shown). The back yoke is a member that holds the permanent magnets and forms a magnetic path, and is made of a magnetic iron-based material such as iron or steel. The permanent magnets are arranged in the M direction such that their north and south poles are alternately directed in the Z2 direction. The permanent magnets face the linear motor stator 13 in the Z direction. The bracket 33 is a member for fixing the magnetic scale 4 to the slider frame 31. The bracket 33 is provided on the inner surface 34 on the W2 direction side among the pair of inner side surfaces 34 and 35. The bracket 33 is fixed to the slider frame 31 by a fastening member.

In the slider 3, a propulsive force is generated by the magnetic interaction between the magnetic flux generated in a coil when currents with different phases are supplied to the linear motor stator 13 (23) and the magnetic flux of the permanent magnets of the linear motor mover 32. That is, the slider 3 is movable in the X direction or the R direction by the propulsive force described above.

Magnetic Scale

As shown in FIGS. 2 and 3, the magnetic scale 4 is a scale for measuring the position of the slider 3 that slides linearly and curvilinearly. The magnetic scale 4 is provided on the slider 3. The magnetic scale 4 is provided on the slider frame 31 via the bracket 33. The magnetic scale 4 is arranged inside the slider frame 31 with linear movement magnetic scales 41 facing the magnetic sensors 5 in the Z direction, and curvilinear movement magnetic scales 42 facing the magnetic sensors 6 in the Z direction.

The magnetic scale 4 includes a base 40, the linear movement magnetic scales 41, and the curvilinear movement magnetic scales 42.

Base

The base 40 is a plate-shaped member made of a magnetic material using a ferrite material, for example. That is, the base 40 has a rectangular shape, the longitudinal direction of which is in the X direction as viewed from the Z1 direction side. The base 40 has a rectangular parallelepiped shape. The thickness of the base 40 in the Z direction is smaller than the width of the base 40 in the Y direction. The linear movement magnetic scales 41 and the curvilinear movement magnetic scales 42 are recorded on the base 40 by being magnetized.

Linear Movement Magnetic Scale and Curvilinear Movement Magnetic Scale

Figure 4:
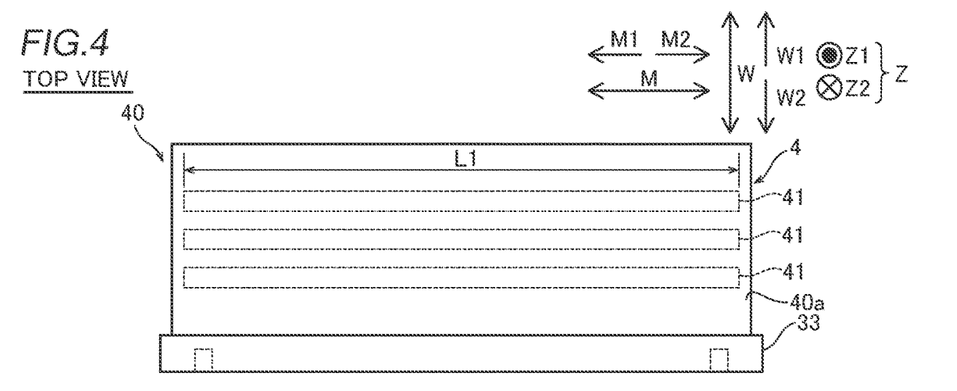
FIG. 4 is a top view of a magnetic scale of the conveyance device according to the first embodiment.

As shown in FIGS. 2 and 4, the linear movement magnetic scales 41 are recorded on the base 40 to measure the position of the slider 3 when the slider 3 is moving on the linear movement drive module 1. The linear movement magnetic scales 41 are provided integrally with the base 40. Although the linear movement magnetic scales 41 are shown by broken lines in FIGS. 2 and 4, this is merely an image for visualizing the linear movement magnetic scales 41 in the figures.

The linear movement magnetic scales 41 are formed linearly along the linear direction (X direction). The linear movement magnetic scales 41 each have a length L1 in the X direction (the moving direction (M direction) of the slider 3). A plurality of (three) linear movement magnetic scales 41 are provided on the base 40. The plurality of linear movement magnetic scales 41 have different magnetization patterns. That is, in the plurality of linear movement magnetic scales 41, the periods and phases of the magnetization patterns are different from each other. Two, or four or more linear movement magnetic scales 41 may be provided on the base 40 instead of three.

The plurality of linear movement magnetic scales 41 are used to identify the plurality of sliders 3 and detect the positions of the plurality of sliders 3. The positions of the sliders 3 are set in correspondence with a difference between detection values of the magnetism of the plurality of linear movement magnetic scales 41, the magnetization patterns of which have different periods and phases.

Figure 5:
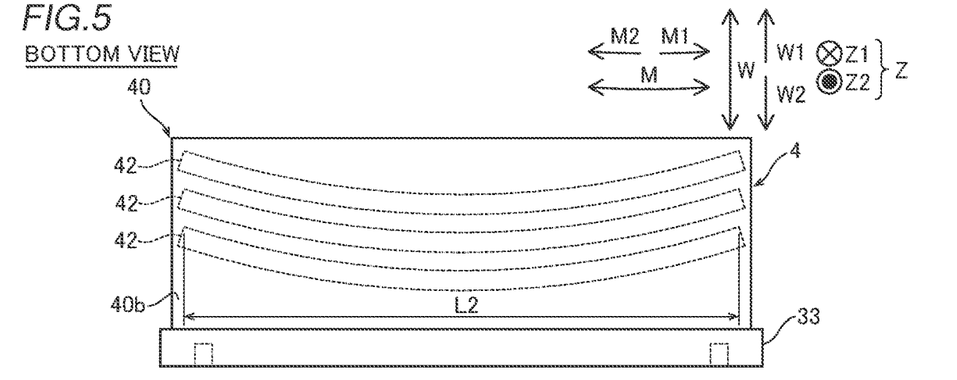
FIG. 5 is a bottom view of the magnetic scale of the conveyance device according to the first embodiment.

As shown in FIGS. 3 and 5, the curvilinear movement magnetic scales 42 are recorded on the base 40 to measure the position of the slider 3 when the slider 3 is moving on the curvilinear movement drive module 2. The curvilinear movement magnetic scales 42 are provided integrally with the base 40. Although the curvilinear movement magnetic scales 42 are shown by broken lines in FIGS. 3 and 5, this is merely an image for visualizing the curvilinear movement magnetic scales 42 in the figures.

The curvilinear movement magnetic scales 42 are formed curvilinearly along the curvilinear direction (R direction). The curvilinear movement magnetic scales 42 each have a length L2 in the M direction. A plurality of (three) curvilinear movement magnetic scales 42 are provided on the base 40. The plurality of curvilinear movement magnetic scales 42 have different magnetization patterns. That is, in the plurality of curvilinear movement magnetic scales 42, the periods and phases of the magnetization patterns are different from each other. Two, or four or more curvilinear movement magnetic scales 42 may be provided on the base 40 instead of three.

The plurality of curvilinear movement magnetic scales 42 are used to identify the plurality of sliders 3 and detect the positions of the plurality of sliders 3. The positions of the sliders 3 are set in correspondence with a difference between detection values of the magnetism of the plurality of curvilinear movement magnetic scales 42, the magnetization patterns of which have different periods and phases.

Figure 6:
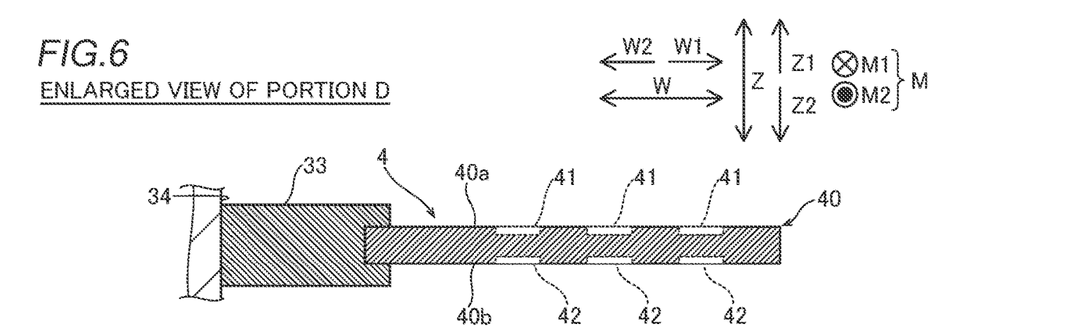
FIG. 6 is an enlarged view of a portion D in FIG. 3.

Positional Relationship Between Linear Movement Magnetic Scale and Curvilinear Movement Magnetic Scale In this embodiment, as shown in FIG. 6, the linear movement magnetic scales 41 and the curvilinear movement magnetic scales 42 are provided integrally with the base 40 and are spaced apart from each other. The linear movement magnetic scales 41 and the curvilinear movement magnetic scales 42 are provided integrally with the base 40 on different surfaces and are spaced apart from each other. Although the linear movement magnetic scales 41 and the curvilinear movement magnetic scales 42 are shown by broken lines in FIG. 6, this is merely an image for visualizing the linear movement magnetic scales 41 and the curvilinear movement magnetic scales 42 in the figure.

Specifically, the linear movement magnetic scales 41 are provided integrally with the base 40 on a first surface 40*a*. The first surface 40*a* is the upper surface of the base 40 on the Z1 direction side. The linear movement magnetic scales 41 face the magnetic sensors 5 in the Z direction (see FIG. 2). The curvilinear movement magnetic scales 42 are provided integrally with the base 40 on a second surface 40*b*. The second surface 40*b* is the lower surface of the base 40 on the Z2 direction side. Thus, the second surface 40*b* is arranged on the back side of the first surface 40*a* in the base 40. The curvilinear movement magnetic scales 42 face the magnetic sensors 6 in the Z direction (see FIG. 3).

Figure 7:
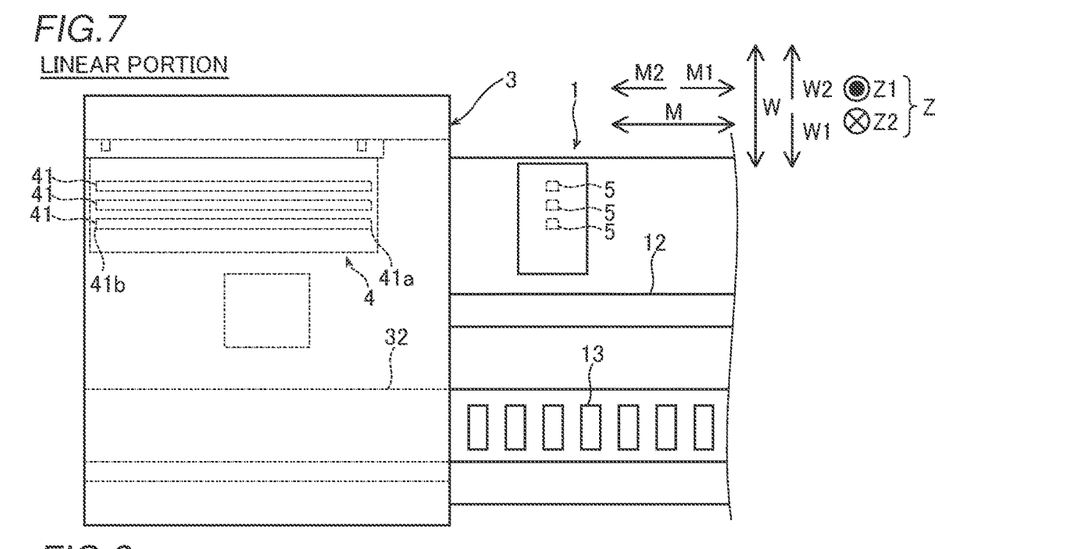
FIG. 7 is a schematic view showing a state in which a slider of the conveyance device according to the first embodiment is moving on a linear portion.
Figure 8:
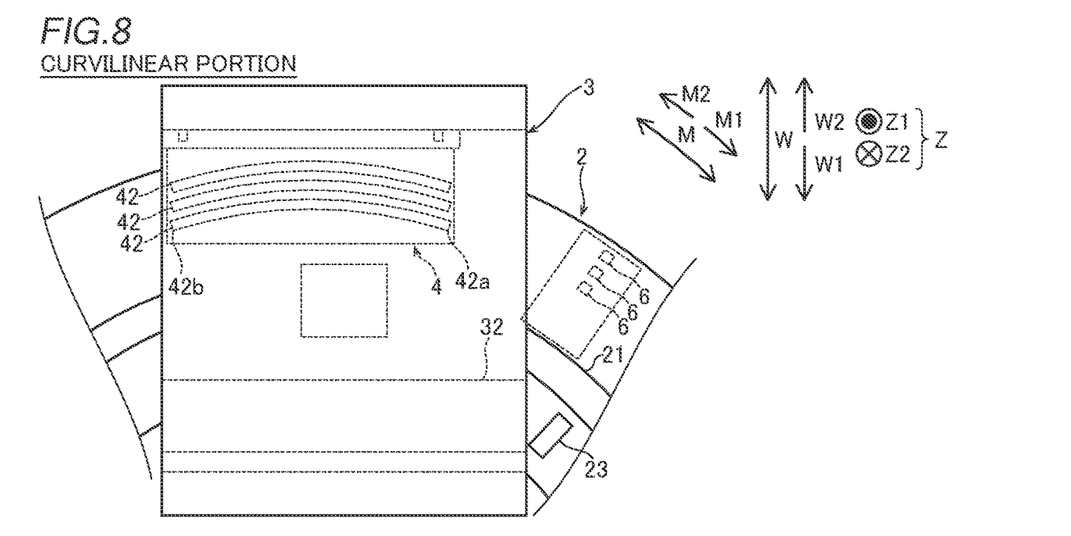
FIG. 8 is a schematic view showing a state in which the slider of the conveyance device according to the first embodiment is moving on a curvilinear portion.

As shown in FIGS. 7 and 8, in the moving direction (M direction) of the slider 3, a first end 41*a* of the linear movement magnetic scale 41 and a first end 42*a* of the curvilinear movement magnetic scale 42 are located at substantially the same position. The first end 41*a* of the linear movement magnetic scale 41 is an end of the linear movement magnetic scale 41 on the M1 direction side. The first end 42*a* of the curvilinear movement magnetic scale 42 is an end of the curvilinear movement magnetic scale 42 on the M1 direction side.

A second end 41*b* of the linear movement magnetic scale 41 and a second end 42*b* of the curvilinear movement magnetic scale 42 are located at substantially the same position. The second end 41*b* of the linear move magnetic scale 41 is an end of the linear movement magnetic scale 41 on the M2 direction side. The second end 42*b* of the curvilinear movement magnetic scale 42 is an end of the curvilinear movement magnetic scale 42 on the M2 direction side.

Magnetic Sensors

As shown in FIG. 7, the magnetic sensors 5 are provided in the linear movement drive module 1. The magnetic sensors 5 detect the magnetism of the linear movement magnetic scales 41. A plurality of magnetic sensors 5 are arranged at a predetermined pitch in the M direction in accordance with the lengths L1 (see FIG. 4) of the linear movement magnetic scales 41 in the X direction. The predetermined pitch is an interval smaller than the length L1. The plurality of (three) magnetic sensors 5 are arranged at a predetermined pitch in the W direction so as to face the plurality of linear movement magnetic scales 41.

As shown in FIG. 8, the magnetic sensors 6 are provided in the curvilinear movement drive module 2. The magnetic sensors 6 detect the magnetism of the curvilinear movement magnetic scales 42. A plurality of magnetic sensors 6 are arranged at a predetermined pitch in the R direction in accordance with the lengths L2 (see FIG. 5) of the curvilinear movement magnetic scales 42 in the M direction. The predetermined pitch is an interval smaller than the length L2. The plurality of (three) magnetic sensors 6 are arranged at a predetermined pitch in the direction orthogonal to the central axis C1 (C2) so as to face the plurality of curvilinear movement magnetic scales 42.

According to the first embodiment, the following advantageous effects are achieved.

According to the first embodiment, as described above, the linear movement magnetic scales 41 and the curvilinear movement magnetic scales 42 are spaced apart from each other. Accordingly, a distance between the linear movement magnetic scales 41 and the curvilinear movement magnetic scales 42 can be ensured, and thus magnetic interference between the linear movement magnetic scales 41 and the curvilinear movement magnetic scales 42 can be more reliably reduced or prevented.

According to the first embodiment, as described above, the linear movement magnetic scales 41 and the curvilinear movement magnetic scales 42 are provided on the different surfaces and are spaced apart from each other. Accordingly, the linear movement magnetic scales 41 and the curvilinear movement magnetic scales 42 can be provided on the different surfaces of the same member, and thus as compared with a case in which the linear movement magnetic scales 41 and the curvilinear movement magnetic scales 42 are provided on surfaces of different members, an increase in the number of components of the conveyance device 100 can be reduced or prevented.

According to the first embodiment, as described above, the magnetic scale 4 is provided on the slider 3. Moreover, the magnetic sensors 5 and the magnetic sensors 6 are provided in the linear movement drive module 1 and the curvilinear movement drive module 2, respectively. Accordingly, the linear movement drive module 1 and the curvilinear movement drive module 2 are fixed at predetermined locations, and thus unlike a case in which the magnetic sensors 5 (8) are provided in a movable structure like the slider 3, power supply equipment for supplying power to the magnetic sensors 5 (8) can be easily connected to the magnetic sensors 5 (8).

According to the first embodiment, as described above, the slider 3 includes the slider frame 31 in which the magnetic scale 4 is located such that the linear movement magnetic scales 41 and the curvilinear movement magnetic scales 42 face the magnetic sensors 5 and the magnetic sensors 8, respectively, in the upward-downward direction. Accordingly, the magnetic scale 4 can be housed inside the slider frame 31, and thus as compared with a case in which the magnetic scale 4 is located outside the slider frame 31 having the same size, an increase in the size of the slider 3 can be reduced or prevented.

According to the first embodiment, as described above, the magnetic scale 4 includes the base 40 with which the linear movement magnetic scales 41 and the curvilinear movement magnetic scales 42 are provided integrally. Accordingly, the linear movement magnetic scales 41 and the curvilinear movement magnetic scales 42 are provided integrally with the same base 40, and thus even when the base 40 expands or contracts due to temperature changes, errors can be caused in measurement of the position of the slider 3 according to the expansion and contraction of the base 40 with respect to the linear movement magnetic scales 41 and the curvilinear movement magnetic scales 42. Therefore, the errors in position measurement of the linear movement magnetic scales 41 and the curvilinear movement magnetic scales 42 can be substantially equal to each other. Consequently, the same correction value can be used to correct errors in position measurement that occur when the slider 3 moves linearly and errors in position measurement that occur when the slider 3 moves curvilinearly, and thus a control for position acquisition can be facilitated.

According to the first embodiment, as described above, the base 40 includes the first surface 40a on which the linear movement magnetic scales 41 are provided, and the second surface 40b that is different from the first surface 40a and on which the curvilinear movement magnetic scales 42 are provided. Accordingly, as compared with a case in which the linear movement magnetic scales 41 and the curvilinear movement magnetic scales 42 are aligned on the same surface, an increase in the dimension of the base 40 in a direction in which the linear movement magnetic scales 41 and the curvilinear movement magnetic scales 42 are aligned can be reduced or prevented, and thus an increase in the size of the conveyance device 100 in the alignment direction described above can be reduced or prevented.

According to the first embodiment, as described above, the second surface 40b is arranged on the back side of the first surface 40a in the base 40. Accordingly, the first surface 40a constitutes the front surface of the base 40, and the second surface 40b constitutes the back surface of the base 40 such that in a plan view, the linear movement magnetic scales 41 and the curvilinear movement magnetic scales 42 can overlap each other. Thus, an increase in the dimension of the base 40 in the M direction can be reduced or prevented.

According to the first embodiment, as described above, in the moving direction of the slider 3, the first end 41a of the linear movement magnetic scale 41 and the first end 42a of the curvilinear movement magnetic scale 42 are located at substantially the same position, and the second end 41b of the linear movement magnetic scale 41 and the second end 42b of the curvilinear movement magnetic scale 42 are located at substantially the same position. Accordingly, the lengths L1 and L2 of the linear movement magnetic scales 41 and the curvilinear movement magnetic scales 42 can be substantially equal to each other in the M direction (the moving direction of the slider 3), and thus when either the linear movement magnetic scales 41 or the curvilinear movement magnetic scales 42 are set to the maximum length according to the installation space, either the curvilinear movement magnetic scales 42 or the linear movement magnetic scales 41 can have the same maximum length. Consequently, the magnetic sensors 5 (8) are arranged such that a distance between the magnetic sensors 5 (8) matches the maximum length, and thus the magnetic sensors 5 (8) can be aligned with a maximum distance between the magnetic sensors 5 (8). Thus, the number of magnetic sensors 5 and the number of magnetic sensors 6 required to measure the position of the slider 3 can be minimized.

Second Embodiment

The structure of a magnetic scale 204 of a conveyance device 200 according to a second embodiment is described with reference to FIG. 9. In the second embodiment, the magnetic scale 204 includes a magnetic shielding plate 243 to block the magnetism of each of linear movement magnetic scales 41 and curvilinear movement magnetic scales 42, unlike the first embodiment. In the second embodiment, detailed description of the same or similar structures as those of the first embodiment is omitted.

Base

Figure 9:
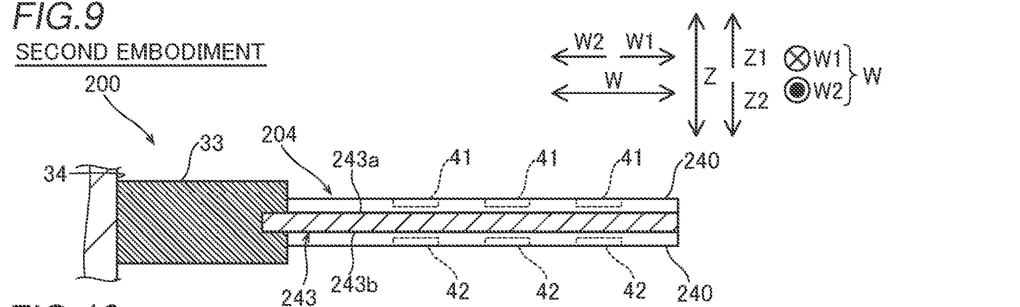
FIG. 9 is an enlarged view of a portion of a conveyance device according to a second embodiment, corresponding to the portion D in FIG. 3.

As shown in FIG. 9, the magnetic scale 204 according to the second embodiment includes the magnetic shielding plate 243 located between the linear movement magnetic scales 41 and the curvilinear movement magnetic scales 42 to block magnetism emitted from each of the linear movement magnetic scales 41 and the curvilinear movement magnetic scales 42. The magnetic shielding plate 243 is made of ferromagnetic metal such as iron. Although the linear movement magnetic scales 41 and the curvilinear movement magnetic scales 42 are shown by broken lines in FIG. 9, this is merely an image for visualizing the linear movement magnetic scales 41 and the curvilinear movement magnetic scales 42 in the figure.

The magnetic shielding plate 243 has a rectangular shape, the longitudinal direction of which is in an M direction as viewed from the Z1 direction side. The magnetic shielding plate 243 has a rectangular parallelepiped shape. The thickness of the magnetic shielding plate 243 in a Z direction is smaller than the width of the magnetic shielding plate 243 in a W direction. A base 240 on which a plurality of (three) linear movement magnetic scales 41 are recorded is attached to a first surface 243a of the magnetic shielding plate 243. The first surface 243a is the upper surface of the magnetic shielding plate 243 on the Z1 direction side. A base 240 on which a plurality of (three) curvilinear movement magnetic scales 42 are recorded is attached to a second surface 243b of the magnetic shielding plate 243. The second surface 243b is the lower surface of the magnetic shielding plate 243 on the Z2 direction side. Two, or four or more linear movement magnetic scales 41 may be recorded on the base 240. Furthermore, two, or four or more curvilinear movement magnetic scales 42 may be recorded on the base 240. The remaining structures of the second embodiment are the same as or similar to those of the first embodiment, and thus description thereof is omitted.

According to the second embodiment, the linear movement magnetic scales 41 and the curvilinear movement magnetic scales 42 are spaced apart from each other, similarly to the first embodiment. Accordingly, magnetic interference between the linear movement magnetic scales 41 and the curvilinear movement magnetic scales 42 can be more reliably reduced or prevented.

According to the second embodiment, as described above, the magnetic scale 204 includes the magnetic shielding plate 243 located between the linear movement magnetic scales 41 and the curvilinear movement magnetic scales 42 to block magnetism emitted from each of the linear movement magnetic scales 41 and the curvilinear movement magnetic scales 42. Accordingly, magnetic interference between the linear movement magnetic scales 41 and the curvilinear movement magnetic scales 42 can be reduced or prevented by the magnetic shielding plate 243, and thus a distance by which the linear movement magnetic scales 41 and the curvilinear movement magnetic scales 42 are spaced apart from each other can be reduced. Consequently, thicknesses required for the bases 240 arranged between the linear movement magnetic scales 41 and the curvilinear movement magnetic scales 42 can be reduced, and thus an increase in the size of the magnetic scale 204 including the linear movement magnetic scales 41, the curvilinear movement magnetic scales 42, and the bases 240 can be reduced or prevented. The remaining advantageous effects of the second embodiment are similar to the advantageous effects of the first embodiment.

Third Embodiment

The structure of a magnetic scale 304 of a conveyance device 300 according to a third embodiment is described with reference to FIG. 10. In the third embodiment, both linear movement magnetic scales 41 and curvilinear movement magnetic scales 42 are provided on the same surface of a base 340, unlike the first embodiment. In the third embodiment, description of the same or similar structures as those of the first embodiment is omitted.

Base

Figure 10:
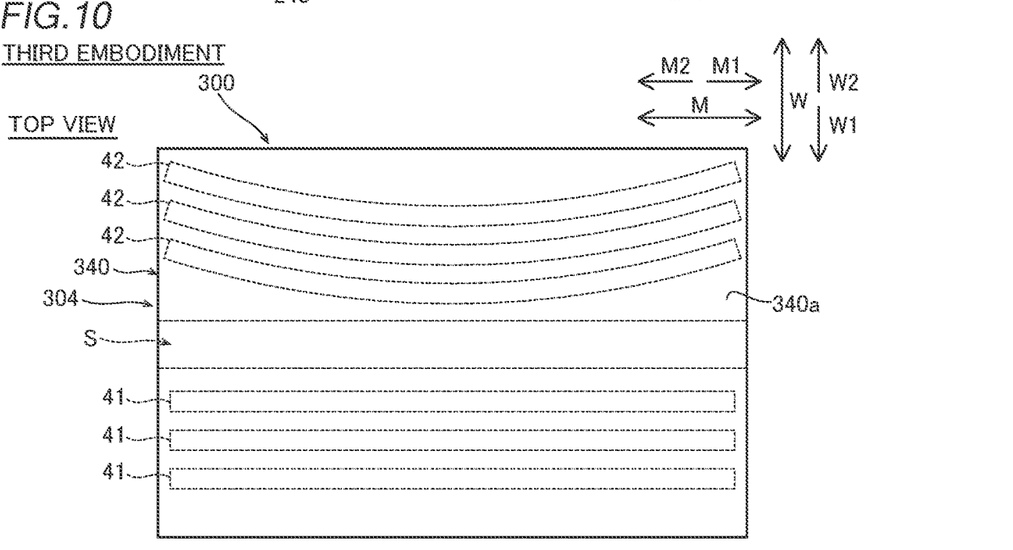
FIG. 10 is a top view of a magnetic scale of a conveyance device according to a third embodiment.

As shown in FIG. 10, the base 340 is a plate-shaped member made of a magnetic material using a ferrite material, for example. The base 340 has a rectangular shape, the longitudinal direction of which is in an M direction as viewed from the Z1 direction side. The base 340 has a rectangular parallelepiped shape. The thickness of the base 340 in a Z direction is smaller than the width of the base 340 in a W direction. Although the linear movement magnetic scales 41 and the curvilinear movement magnetic scales 42 are shown by broken lines in FIG. 10, this is merely an image for visualizing the linear movement magnetic scales 41 and the curvilinear movement magnetic scales 42 in the figure.

Both the linear movement magnetic scales 41 and the curvilinear movement magnetic scales 42 are provided side by side on the same surface 340a of the base 340. The same surface 340a is the upper surface of the base 340. The linear movement magnetic scales 41 and the curvilinear movement magnetic scales 42 are provided on the same surface 340a of the base 340 and are spaced apart from each other in a direction in which the linear movement magnetic scales 41 and the curvilinear movement magnetic scales 42 are aligned. Specifically, an isolation space S is provided between a group of a plurality of linear movement magnetic scales 41 and a group of a plurality of curvilinear movement magnetic scales 42.

According to the third embodiment, the following advantageous effects are achieved.

According to the third embodiment, the linear movement magnetic scales 41 and the curvilinear movement magnetic scales 42 are spaced apart from each other, similarly to the first embodiment. Accordingly, magnetic interference between the linear movement magnetic scales 41 and the curvilinear movement magnetic scales 42 can be more reliably reduced or prevented.

According to the third embodiment, as described above, the linear movement magnetic scales 41 and the curvilinear movement magnetic scales 42 are provided on the same surface 340a and are spaced apart from each other. Accordingly, the linear movement magnetic scales 41 and the curvilinear movement magnetic scale 42s can be provided on the same surface 340a of the same member, and thus as compared with a case in which the linear movement magnetic scales 41 and the curvilinear movement magnetic scales 42 are provided on surfaces of different members, an increase in the number of components of the conveyance device 300 can be reduced or prevented.

According to the third embodiment, as described above, in the conveyance device 100, the linear movement magnetic scales 41 and the curvilinear movement magnetic scales 42 are provided on the same surface 340a of the base 340 and are spaced apart from each other in the direction in which the linear movement magnetic scales 41 and the curvilinear movement magnetic scales 42 are aligned. Accordingly, the linear movement magnetic scales 41 and the curvilinear movement magnetic scales 42 are provided on the same surface 340a of the base 340 such that as compared with a case in which the linear movement magnetic scales 41 and the curvilinear movement magnetic scales 42 are aligned in a direction perpendicular to the same surface 340a, an increase in a space for installing the linear movement magnetic scales 41 and the curvilinear movement magnetic scales 42 in the direction perpendicular to the same surface 340a can be reduced or prevented. The remaining advantageous effects of the third embodiment are similar to the advantageous effects of the first embodiment.

Fourth Embodiment

The structure of a magnetic scale 404 of a conveyance device 400 according to a fourth embodiment is described with reference to FIG. 11. In the fourth embodiment, a first surface 440a and a second surface 440b are substantially orthogonal to each other in a base 440, unlike the first embodiment. In the fourth embodiment, description of the same or similar structures as those of the first embodiment is omitted.

Base

Figure 11:
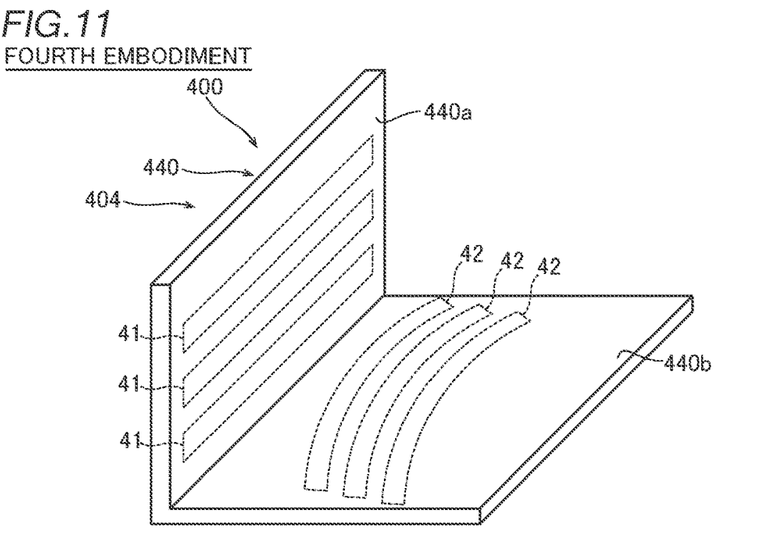
FIG. 11 is a perspective view showing a magnetic scale of a conveyance device according to a fourth embodiment.

As shown in FIG. 11, the base 440 is made of a magnetic material using a ferrite material, for example. The base 440 is an angle member having a substantially L-shape in a cross-section along a Z direction. Although linear movement magnetic scales 41 and curvilinear movement magnetic scales 42 are shown by broken lines in FIG. 11, this is merely an image for visualizing the linear movement magnetic scales 41 and the curvilinear movement magnetic scales 42 in the figure.

The linear movement magnetic scales 41 are recorded on the first surface 440a of the base 440. The first surface 440a is the inner side surface of the base 440. The curvilinear movement magnetic scales 42 are recorded on the second surface 440b of the base 440. The second surface 440b is the inner bottom surface of the base 440. The second surface 440b and the first surface 440a are substantially orthogonal to each other.

According to the fourth embodiment, the following advantageous effects are achieved.

According to the fourth embodiment, the linear movement magnetic scales 41 and the curvilinear movement magnetic scales 42 are spaced apart from each other, similarly to the first embodiment. Accordingly, magnetic interference between the linear movement magnetic scales 41 and the curvilinear movement magnetic scales 42 can be more reliably reduced or prevented.

According to the fourth embodiment, as described above, the second surface 440b and the first surface 440a are substantially orthogonal to each other. Accordingly, the linear movement magnetic scales 41 are provided on the first surface 440a, and the curvilinear movement magnetic scales 42 are provided on the second surface 440b that is substantially orthogonal to the first surface 440a, and thus magnetic sensors 5 that detect the magnetism of the linear movement magnetic scales 41 can be placed in the vicinity of magnetic sensors 6 that detect the magnetism of the curvilinear movement magnetic scales 42. Consequently, a space required to place the magnetic sensors 5 and the magnetic sensors 6 can be made compact. The remaining advantageous effects of the fourth embodiment are similar to the advantageous effects of the first embodiment.

Fifth Embodiment

The structure of a magnetic scale 504 of a conveyance device 500 according to a fifth embodiment is described with reference to FIG. 12. In the fifth embodiment, a second surface 540b and a first surface 540a are substantially orthogonal to each other, unlike the first embodiment. In the fifth embodiment, description of the same or similar structures as those of the first embodiment is omitted.

Base

Figure 12:
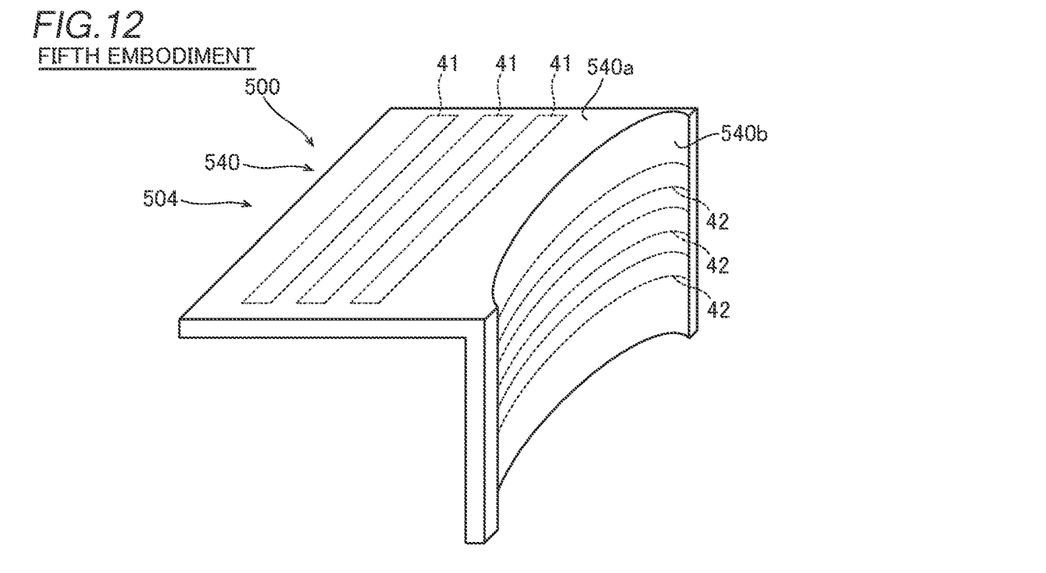
FIG. 12 is a perspective view showing a magnetic scale of a conveyance device according to a fifth embodiment.

As shown in FIG. 12, a base 540 is made of a magnetic material using a ferrite material, for example. Although linear movement magnetic scales 41 and curvilinear movement magnetic scales 42 are shown by broken lines in FIG. 12, this is merely an image for visualizing the linear movement magnetic scales 41 and the curvilinear movement magnetic scales 42 in the figure.

The linear movement magnetic scales 41 are recorded on the first surface 540a of the base 540. The first surface 540a is the upper surface of the base 540. The curvilinear movement magnetic scales 42 are recorded on the second surface 540b of the base 540. The second surface 540b is the outer side surface of the base 540. The second surface 540b and the first surface 540a are substantially orthogonal to each other. The second surface 540b is a curved surface corresponding to the curvature of the curvilinear movement magnetic scales 42.

According to the fifth embodiment, the following advantageous effects are achieved.

According to the fifth embodiment, the linear movement magnetic scales 41 and the curvilinear movement magnetic scales 42 are spaced apart from each other, similarly to the first embodiment. Accordingly, magnetic interference between the linear movement magnetic scales 41 and the curvilinear movement magnetic scales 42 can be more reliably reduced or prevented.

According to the fifth embodiment, as described above, the second surface 540b and the first surface 540a are substantially orthogonal to each other. The second surface 540b is a curved surface corresponding to the curvature of the curvilinear movement magnetic scales 42. Accordingly, the curved surface of the second surface 540b is formed along the curvilinear direction of a slider 3, and thus the position of the slider 3 during curvilinear movement can be appropriately detected by the curvilinear movement magnetic scales 42 provided on the second surface 540b. The remaining advantageous effects of the fifth embodiment are similar to the advantageous effects of the first embodiment.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which in the magnetic scale 4 (204, 304, 404, and 504), the linear movement magnetic scales 41 and the curvilinear movement magnetic scales 42 are provided integrally with the base 40 (240, 340, 440, and 540) has been shown in each of the aforementioned first to fifth embodiments, the present disclosure is not restricted to this. In the present disclosure, as in a first modified example shown in FIG. 13, one set of linear movement magnetic scales 41 and two sets of curvilinear movement magnetic scales 42 may be provided integrally not with a base 40 but with a base member 640. Specifically, a conveyance device 600 includes a magnetic scale 604 and a back yoke 607. The magnetic scale 604 includes the base member 640 in which linear movement magnetic scales 41 and curvilinear movement magnetic scales 42 are provided. The curvilinear movement magnetic scales 42 include first curvilinear scales 642a formed along a first curvilinear direction as a curvilinear direction, and second curvilinear scales 642b formed along a second curvilinear direction different from the first curvilinear direction. The base member 640 includes a linear position detection surface 640a that constitutes the lower surface of the base member 640 and on which the linear movement magnetic scales 41 are provided. The base member 640 includes a first curvilinear position detection surface 640b that protrudes from the linear position detection surface 640a and on which the first curvilinear scales 642a are provided. The base member 640 includes a second curvilinear position detection surface 640c that faces the first curvilinear position detection surface 640b and on which the second curvilinear scales 642b are provided.

Figure 13:
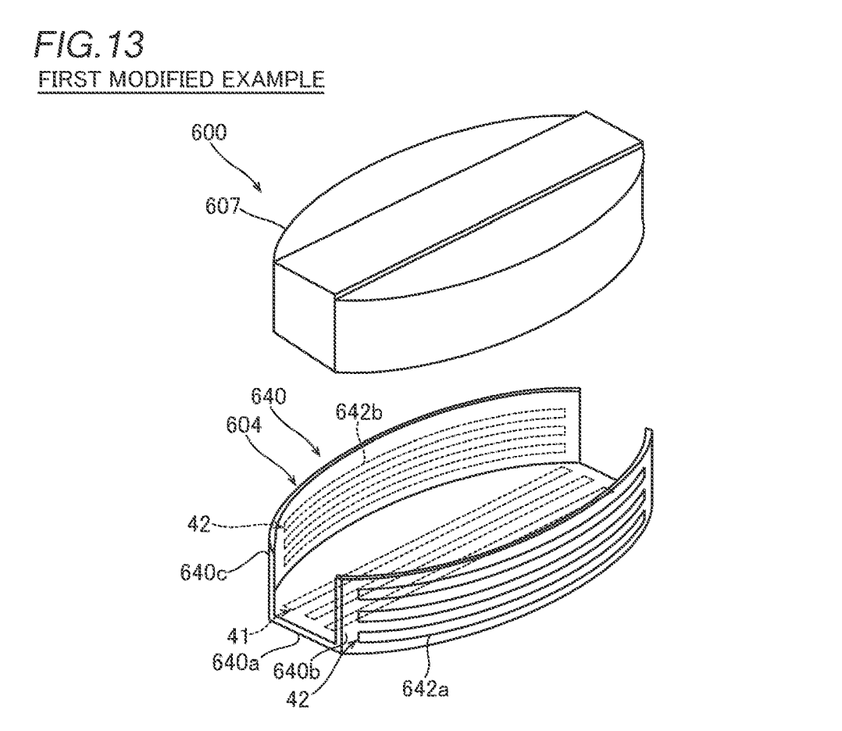
FIG. 13 is a perspective view showing a back yoke and a magnetic scale of a conveyance device according to a first modified example of the first embodiment.

Accordingly, with the first curvilinear scales 642a and the second curvilinear scales 642b, the position of a slider 3 can be measured when the slider 3 moves curvilinearly in a plurality of curvilinear directions including the first curvilinear direction and the second curvilinear direction, and thus the position measurement can be performed even when the slider 3 moves curvilinearly in curvilinear directions that are opposite to each other. Thus, the degree of freedom of a path along which the slider 3 moves can be improved. The magnetic scale 604 may be formed by magnetizing each of the linear movement magnetic scales 41, the first curvilinear scales 642a, and the second curvilinear scales 642b to a magnetic material and then bonding it to the base member 640. Alternatively, the magnetic scale 604 may be formed by magnetizing each of the linear movement magnetic scales 41, the first curvilinear scales 642a, and the second curvilinear scales 642b to a magnetic body bonded to the base member 640. Alternatively, the magnetic scale 604 may be formed by insert-molding a plurality of magnetic materials to which the linear movement magnetic scales 41, the first curvilinear scales 642a, and the second curvilinear scales 642b have been magnetized into the base member 640.

While the example in which the linear movement magnetic scales 41 and the curvilinear movement magnetic scales 42 are provided integrally with the base 40 (240, 340, 440, and 540) has been shown in each of the aforementioned first to fifth embodiments, the present disclosure is not restricted to this. In the present disclosure, the magnetic material to which the linear movement magnetic scales and the curvilinear movement magnetic scales have been magnetized may be bonded to the base.

While the example in which the magnetic scale 4 (204, 304, 404, and 504) is provided on the slider 3 has been shown in each of the aforementioned first to fifth embodiments, the present disclosure is not restricted to this. In the present disclosure, the magnetic scale may be provided on the drive module. In this case, the magnetic sensor is provided in the slider instead of the drive module.

While the example in which the magnetic scale 4 (204, 304, 404, and 504) is arranged inside the slider frame 31 has been shown in the aforementioned first embodiment, the present disclosure is not restricted to this. In the present disclosure, the magnetic scale may be arranged outside the slider frame.

While the example in which the base 40 (240, 340, 440, and 540) is a thin plate, the thickness of which is smaller than its width in the Y direction, has been shown in each of the aforementioned first to third embodiments, the present disclosure is not restricted to this. In the present disclosure, the base may be a thin plate, the thickness in the Y direction of which is smaller than its width in the Z direction.

While the example in which the same surface 340a is the upper surface of the base 40 (240, 340, 440, and 540) has been shown in the aforementioned third embodiment, the present disclosure is not restricted to this. In the present disclosure, the same surface may be a lower surface or a side surface, for example, other than the upper surface.

While the example in which the conveyance device 100 (200, 300, 400, 500) is a linear conveyor that moves the slider 3 along the circular path 102 using a linear motor has been shown in each of the aforementioned first to fifth embodiments, the present disclosure is not restricted to this. In the present disclosure, the conveyance device may drive the slider by driving a belt conveyor. Furthermore, the conveyance device may be a device combined with a conveyance mechanism that conveys the entire slider in a direction orthogonal to the linear movement direction of the slider.

While the example in which the path along which the slider 3 moves is an annular circular path 102 provided in a horizontal plane has been shown in each of the aforementioned first to fifth embodiments, the present disclosure is not restricted to this. In the present disclosure, the path along which the slider moves may have a slope inclined with respect to the horizontal plane.

While the example in which the path along which the slider 3 moves is a circular path 102 that is circular in the plan view has been shown in each of the aforementioned first to fifth embodiments, the present disclosure is not restricted to this. In the present disclosure, the path along which the slider moves may not be a circular path, but may be a J-shaped path in the plan view.

While the example in which three linear movement magnetic scales 41 and three curvilinear movement magnetic scales 42 are provided has been shown in each of the aforementioned first to fifth embodiments, the present disclosure is not restricted to this. In the present disclosure, two or four or more linear movement magnetic scales and two or four or more curvilinear movement magnetic scales may be provided.

While the example in which the base 440 is an angle member having a substantially L-shape in the cross-section along the Z direction (upward-downward direction) has been shown in the aforementioned fourth embodiment, the present disclosure is not restricted to this. In the present disclosure, the base may be a substantially C-shaped member having a first surface and a second surface that face each other in the upward-downward direction and a connecting surface that connects the first surface to the second surface.

While the example in which the second surface 440b (562) and the first surface 440a (561) are substantially orthogonal to each other has been shown in each of the aforementioned fourth and fifth embodiments, the present disclosure is not restricted to this. In the present disclosure, the second surface and the first surface may intersect with each other at an acute angle or an obtuse angle.

While the example in which the magnetic scale 4 is arranged inside the slider frame 31 with the linear movement magnetic scales 41 facing the magnetic sensors 5 in the Z direction, and the curvilinear movement magnetic scales 42 facing the magnetic sensors 6 in the Z direction has been shown in the aforementioned first embodiment, the present disclosure is not restricted to this. The magnetic scale may be arranged inside the slider frame with the linear movement magnetic scales facing the magnetic sensors in the width direction, and the curvilinear movement magnetic scales facing the magnetic sensors in the width direction.

Figure 14:
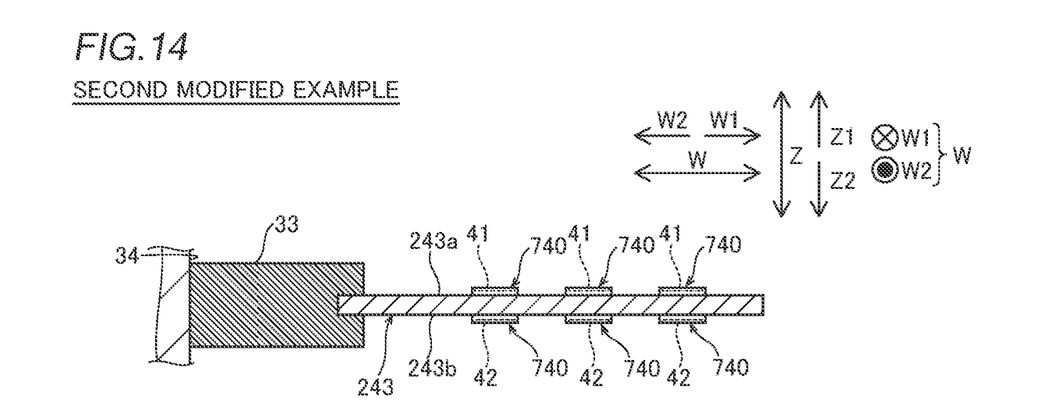
FIG. 14 is a sectional view showing a magnetic scale and a magnetic shielding plate of a conveyance device according to a second modified example of the second embodiment.

While the example in which the base 240 on which the plurality of (three) linear movement magnetic scales 41 are recorded is attached to the first surface 243a of the magnetic shielding plate 243, and the base 240 on which the plurality of (three) curvilinear movement magnetic scales 42 are recorded is attached to the second surface 243b of the magnetic shielding plate 243 has been shown in the aforementioned second embodiment, the present disclosure is not restricted to this. In the present disclosure, as in a second modified example shown in FIG. 14, a plurality of (three) bases 740 on which linear movement magnetic scales 41 are recorded may be attached to a first surface 243a of a magnetic shielding plate 243. Furthermore, a plurality of (three) bases 740 on which curvilinear movement magnetic scales 42 are recorded may be attached to a second surface 243b of the magnetic shielding plate 243. Alternatively, two, or four or more bases 740 on which the linear movement magnetic scales 41 are recorded may be attached to the first surface 243a of the magnetic shielding plate 243. Furthermore, two, or four or more bases 740 on which the curvilinear movement magnetic scales 42 are recorded may be attached to the second surface 243b of the magnetic shielding plate 243. Although the linear movement magnetic scales 41 and the curvilinear movement magnetic scales 42 are shown by broken lines in FIG. 14, this is merely an image for visualizing the linear movement magnetic scales 41 and the curvilinear movement magnetic scales 42 in the figure.

Figure 15:
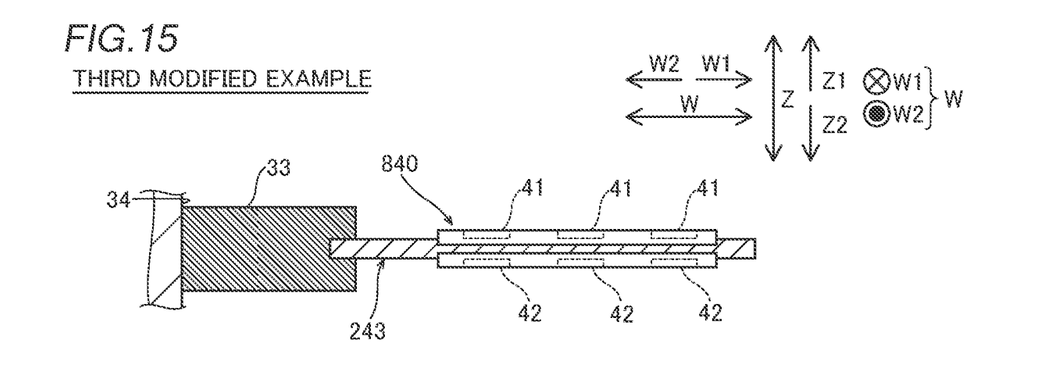
FIG. 15 is a sectional view showing a magnetic scale and a magnetic shielding plate of a conveyance device according to a third modified example of the second embodiment.
Figure 16:
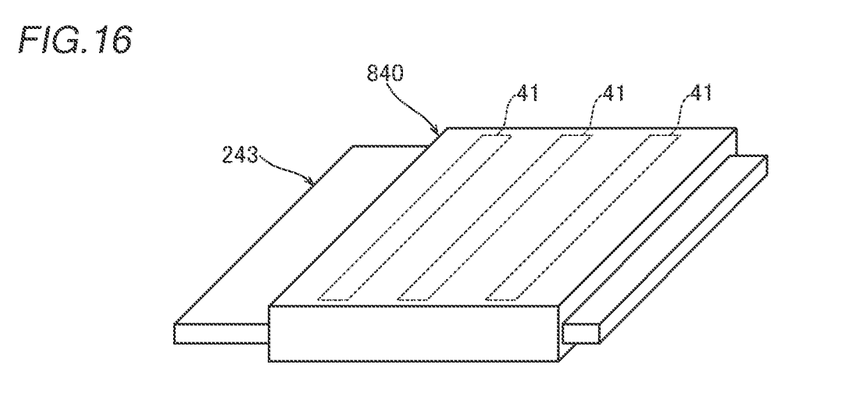
FIG. 16 is a perspective view showing the magnetic scale and the magnetic shielding plate of the conveyance device according to the third modified example of the second embodiment.

While the example in which the base 240 on which the plurality of (three) linear movement magnetic scales 41 are recorded is attached to the first surface 243a of the magnetic shielding plate 243, and the base 240 on which the plurality of (three) curvilinear movement magnetic scales 42 are recorded is attached to the second surface 243b of the magnetic shielding plate 243 has been shown in the aforementioned second embodiment, the present disclosure is not restricted to this. In the present disclosure, as in a third modified example shown in FIGS. 15 and 16, a base 840 on which a plurality of (three) linear movement magnetic scales 41 and a plurality of (three) curvilinear movement magnetic scales 42 are recorded may be insert-molded into a magnetic shielding plate 243. Alternatively, two, or four or more linear movement magnetic scales 41 may be recorded on the base 840. Furthermore, two, or four or more curvilinear movement magnetic scales 42 may be recorded on the base 840. Although the linear movement magnetic scales 41 and the curvilinear movement magnetic scales 42 are shown by broken lines in FIGS. 15 and 16, this is merely an image for visualizing the linear movement magnetic scales 41 and the curvilinear movement magnetic scales 42 in the figures.

What is claimed is:

1. A conveyance device comprising:
   a slider configured to move along a linear direction and a curvilinear direction;
   a drive module configured to move the slider along the linear direction or the curvilinear direction;
   a magnetic scale including linear movement magnetic scales configured linearly along the linear direction, and curvilinear movement magnetic scales configured curvilinearly along the curvilinear direction and provided on either the slider or the drive module; and
   magnetic sensors in either the drive module or the slider and configured to detect magnetism of the linear movement magnetic scales and the curvilinear movement magnetic scales, respectively; wherein
   the linear movement magnetic scales and the curvilinear movement magnetic scales are spaced apart from each other.

2. The conveyance device according to claim 1, wherein the linear movement magnetic scales and the curvilinear movement magnetic scales are on a same surface or different surfaces and are spaced apart from each other.

3. The conveyance device according to claim 1, wherein the magnetic scale is on the slider; and
   the magnetic sensors are in the drive module.

4. The conveyance device according to claim 3, wherein the slider includes a slider frame in which the magnetic scale is located such that the linear movement magnetic scales and the curvilinear movement magnetic scales face the magnetic sensors in an upward-downward direction or in a width direction orthogonal to the upward-downward direction and a moving direction of the slider.

5. The conveyance device according to claim 1, wherein the magnetic scale further includes a base with which the linear movement magnetic scales and the curvilinear movement magnetic scales are integral.

6. The conveyance device according to claim 5, wherein the base includes:
   a first surface on which the linear movement magnetic scales are provided; and
   a second surface that is different from the first surface and on which the curvilinear movement magnetic scales are provided.

7. The conveyance device according to claim 6, wherein the second surface is on a back side of the first surface in the base.

8. The conveyance device according to claim 7, wherein the base includes a magnetic shielding plate between the linear movement magnetic scales and the curvilinear movement magnetic scales to block magnetism emitted from each of the linear movement magnetic scales and the curvilinear movement magnetic scales.

9. The conveyance device according to claim 6, wherein the second surface and the first surface are substantially orthogonal to each other.

10. The conveyance device according to claim 9, wherein the second surface and the first surface are substantially orthogonal to each other; and
    the second surface is a curved surface corresponding to a curvature of the curvilinear movement magnetic scales.

11. The conveyance device according to claim 5, wherein the linear movement magnetic scales and the curvilinear movement magnetic scales are on a same surface of the base and are spaced apart from each other in a direction in which the linear movement magnetic scales and the curvilinear movement magnetic scales are aligned.

12. The conveyance device according to claim 1, wherein the magnetic scale further includes a base member in which the linear movement magnetic scales and the curvilinear movement magnetic scales are provided;
    the curvilinear movement magnetic scales include:
      first curvilinear scales configured along a first curvilinear direction as the curvilinear direction; and
      second curvilinear scales configured along a second curvilinear direction different from the first curvilinear direction;
    the base member includes:
      a linear position detection surface that configures an upper surface or a lower surface of the base member and on which the linear movement magnetic scales are provided;
      a first curvilinear position detection surface that protrudes from the linear position detection surface and on which the first curvilinear scales are provided; and
      a second curvilinear position detection surface that faces the first curvilinear position detection surface and on which the second curvilinear scales are provided.

13. The conveyance device according to claim 1, wherein the magnetic scale is on the slider; and
    in a moving direction of the slider, first ends of the linear movement magnetic scales and first ends of the curvilinear movement magnetic scales are at substantially a same position, and second ends of the linear movement magnetic scales and second ends of the curvilinear movement magnetic scales are at substantially a same position.

14. The conveyance device according to claim 2, wherein the magnetic scale is on the slider; and
the magnetic sensors are in the drive module.

15. The conveyance device according to claim 2, wherein the magnetic scale further includes a base with which the linear movement magnetic scales and the curvilinear movement magnetic scales are integral.

16. The conveyance device according to claim 3, wherein the magnetic scale further includes a base with which the linear movement magnetic scales and the curvilinear movement magnetic scales are integral.

17. The conveyance device according to claim 4, wherein the magnetic scale further includes a base with which the linear movement magnetic scales and the curvilinear movement magnetic scales are integral.

18. The conveyance device according to claim 2, wherein the magnetic scale further includes a base member in which the linear movement magnetic scales and the curvilinear movement magnetic scales are provided;
the curvilinear movement magnetic scales include:
    first curvilinear scales configured along a first curvilinear direction as the curvilinear direction; and
    second curvilinear scales configured along a second curvilinear direction different from the first curvilinear direction;
the base member includes:
    a linear position detection surface that configures an upper surface or a lower surface of the base member and on which the linear movement magnetic scales are provided;
    a first curvilinear position detection surface that protrudes from the linear position detection surface and on which the first curvilinear scales are provided; and
    a second curvilinear position detection surface that faces the first curvilinear position detection surface and on which the second curvilinear scales are provided.

19. The conveyance device according to claim 3, wherein the magnetic scale further includes a base member in which the linear movement magnetic scales and the curvilinear movement magnetic scales are provided;
the curvilinear movement magnetic scales include:
    first curvilinear scales configured along a first curvilinear direction as the curvilinear direction; and
    second curvilinear scales configured along a second curvilinear direction different from the first curvilinear direction;
the base member includes:
    a linear position detection surface that configures an upper surface or a lower surface of the base member and on which the linear movement magnetic scales are provided;
    a first curvilinear position detection surface that protrudes from the linear position detection surface and on which the first curvilinear scales are provided; and
    a second curvilinear position detection surface that faces the first curvilinear position detection surface and on which the second curvilinear scales are provided.

20. The conveyance device according to claim 2, wherein the magnetic scale is on the slider; and
in a moving direction of the slider, first ends of the linear movement magnetic scales and first ends of the curvilinear movement magnetic scales are at substantially a same position, and second ends of the linear movement magnetic scales and second ends of the curvilinear movement magnetic scales are at substantially a same position.

* * * * *